(12) United States Patent
Vanderveen et al.

(10) Patent No.: US 6,375,151 B1
(45) Date of Patent: Apr. 23, 2002

(54) RETURN SPRING MECHANISM FOR AN ELECTRONIC THROTTLE CONTROL ASSEMBLY

(75) Inventors: James K. Vanderveen, Blenheim; Zhouxuan Xia, Windsor, both of (CA)

(73) Assignee: Siemens Canada Limited, Tilbury (CA)

(*) Notice: Subject to any disclaimer, the term of this patent is extended or adjusted under 35 U.S.C. 154(b) by 0 days.

(21) Appl. No.: 09/650,575

(22) Filed: Aug. 30, 2000

Related U.S. Application Data
(60) Provisional application No. 60/152,911, filed on Sep. 8, 1999, and provisional application No. 60/186,175, filed on Mar. 5, 2000.

(51) Int. Cl.[7] ............................................... F16K 31/02
(52) U.S. Cl. ................ 251/129.12; 251/69; 123/339.13
(58) Field of Search ....................... 251/129.11, 129.12, 251/129.13, 285, 288, 69; 123/339.15, 361, 339.13

(56) References Cited

U.S. PATENT DOCUMENTS

| | | | |
|---|---|---|---|
| 5,492,097 A | | 2/1996 | Byram, et al. ............... 123/396 |
| 5,752,484 A | | 5/1998 | Apel et al. .................. 123/396 |
| 6,070,852 A | * | 6/2000 | McDonnell et al. ... 251/129.11 |
| 6,095,488 A | * | 8/2000 | Semeyn, Jr. et al. .... 251/129.12 |
| 6,155,533 A | * | 12/2000 | Semeyn et al. ........ 251/129.12 |
| 6,244,565 B1 | * | 6/2001 | McDonnell et al. ... 251/129.11 |

FOREIGN PATENT DOCUMENTS

| | | |
|---|---|---|
| DE | 4132653 A1 | 4/1993 |
| EP | 06511147 A1 | 9/1994 |

OTHER PUBLICATIONS

International Search Report Mailed Oct. 18, 2001.

* cited by examiner

Primary Examiner—John Kwon
Assistant Examiner—Patrick Buechner

(57) ABSTRACT

A vehicle electronic throttle control assembly includes a position controlling device that automatically returns the throttle assembly components to a home position. A generally arcuate spring interacts with a plate portion supported on a shaft that is associated with the throttle blade portion. The natural bias of the spring biases the shaft and blade portion into a home position. The position controlling device accommodates situations where the electric motor assembly of the throttle control arrangement fails to operate as desired or does not receive proper power or command signals, for example.

16 Claims, 2 Drawing Sheets

RETURN SPRING MECHANISM FOR AN ELECTRONIC THROTTLE CONTROL ASSEMBLY

RELATED APPLICATIONS

This application claims priority to U.S. Provisional Application No. 60/152,911 filed on Sep. 8, 1999, and U.S. Provisional Application No. 60,186,175 filed on Mar. 5, 2000.

BACKGROUND OF THE INVENTION

This invention generally relates to vehicle electronic throttle controls. More particularly, this invention relates to a return spring mechanism for an electronic throttle control assembly.

Vehicle throttle control assemblies typically include a throttle body having an air inlet. A blade portion typically is positioned within the inlet and manipulated to control the amount of air flow. Conventional arrangements included springs and linkages for controlling the position of the blade portion responsive to movement of the accelerator pedal.

More recently, electronic throttle control assemblies that replace the mechanical linkages and springs with an electrically powered arrangement have been introduced. An electric motor provides the motive force to move the blade among various positions within the inlet to control air flow. The electric motor receives signals from a controller that generates command signals based upon the driver's activation of the accelerator pedal.

One challenge associated with an electronically controlled throttle assembly is addressing situations where the electric motor stops operating properly or there is some malfunction in communicating control signals or power to the motor. The electric motor arrangement does not include any mechanism for automatically returning the throttle blade to a closed position to prevent the motor from running at an undesirably high rate when the driver does not manipulate the accelerator pedal. Additionally, there is no ability to move the blade from a fully closed position, which would be desirable to be able to move the vehicle to a service location, for example.

Accordingly, there is a need for a device to control the position of the throttle assembly components even when the electric motor is not operating as intended. This invention addresses that need.

SUMMARY OF THE INVENTION

In general terms, this invention is an electronic throttle assembly for a vehicle with an automated, mechanical return mechanism to control the position of the throttle assembly components. The inventive arrangement includes a throttle housing having an air inlet opening. A blade portion is supported within the opening. An electric motor selectively moves the blade between a plurality of positions within the opening. A position controlling device includes a generally arcuate spring that biases the blade portion into a home position.

In a preferred embodiment, the home position permits some air flow into the opening to permit the vehicle to be driven to a service location, for example. The position controlling device preferably includes an arcuate spring. One end of the spring engages a plate portion that is associated with the shaft that supports the blade within the air inlet. The resting position of the spring preferably biases the blade portion into the slightly opened, home position.

The various features and advances of this invention will become apparent to those skilled in the art from the following detailed description of the currently preferred embodiment. The drawing that accompany the detailed description can be briefly described as follows.

DETAILED DESCRIPTION OF THE PREFERRED EMBODIMENT

Figure 1:
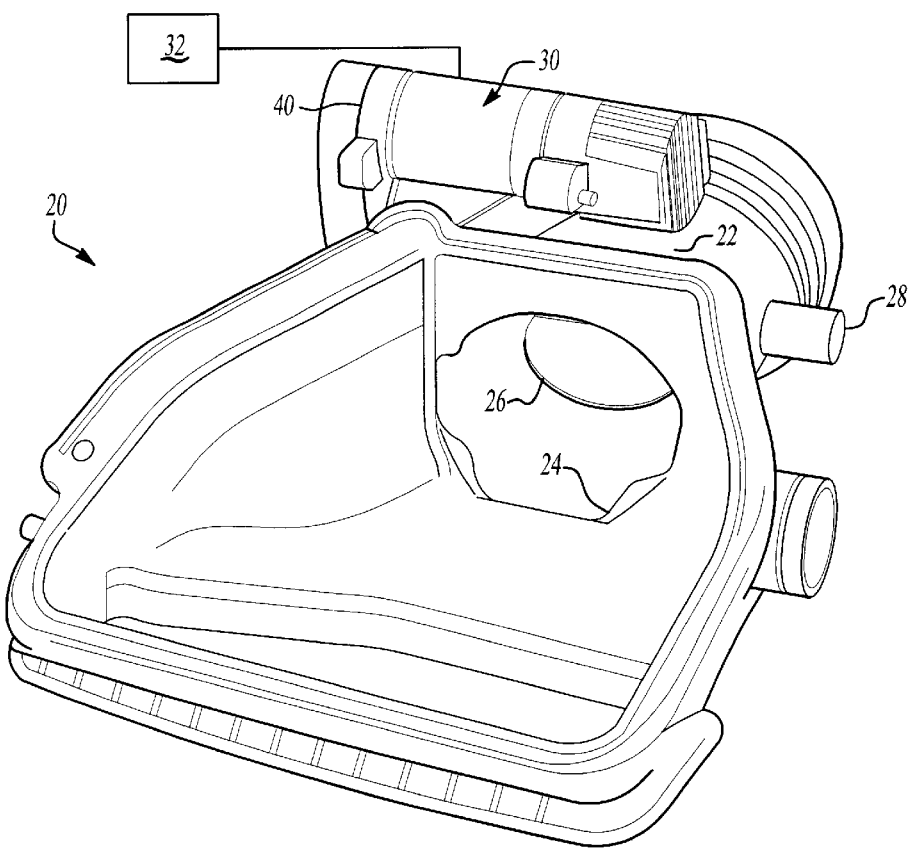
FIG. 1 diagrammatically illustrates an electronic throttle control assembly designed according to this invention.

A vehicle throttle assembly 20 includes a throttle housing 22 that has an air inlet 24. A blade portion 26 is positioned within the air inlet 24. The blade portion 26 is supported on a shaft 28 and moved into a plurality of positions by an electric motor assembly 30. A motor portion of the electric motor assembly 30 provides the motive force for rotating the blade 26 and the shaft 28 to control the amount of air flowing into the inlet 24. A controller 32 provides command signals to the motor assembly 30 to achieve the desired blade position based upon the driver's manipulation of the vehicle accelerator pedal.

Figure 2:
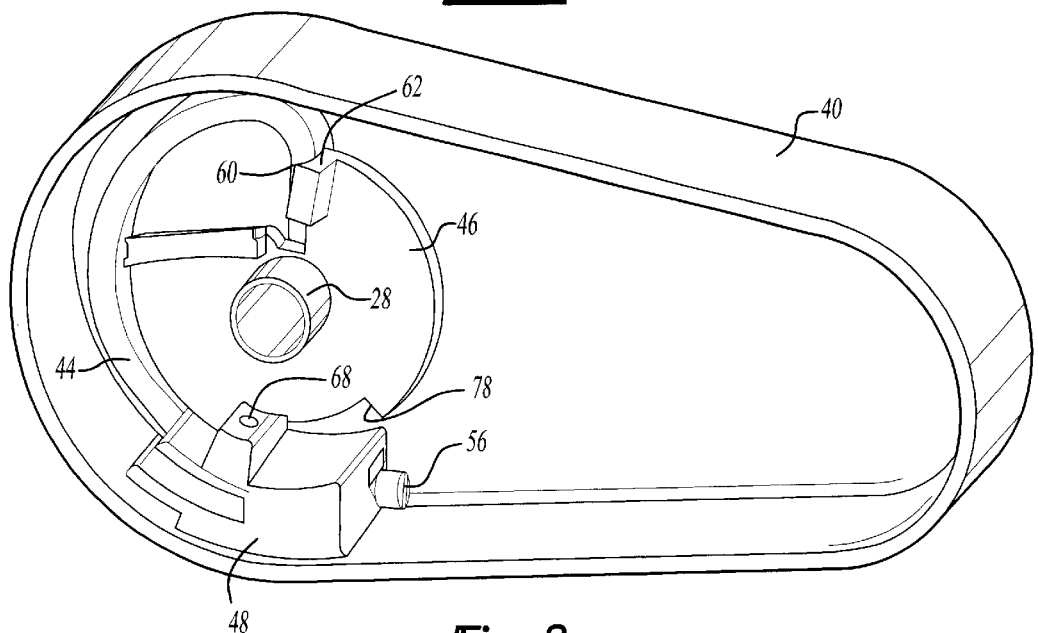
FIG. 2 illustrates a position controlling device designed according to this invention.
Figure 3:
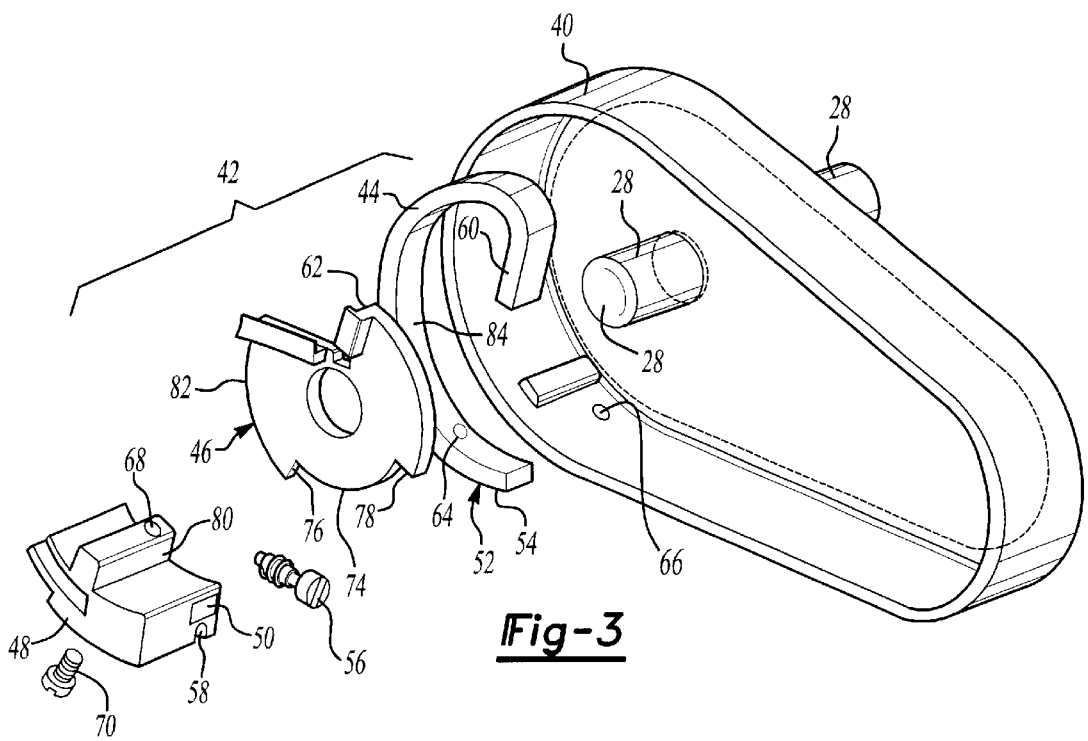
FIG. 3 is an exploded, perspective view of the position controlling device of FIG. 2.
Figure 4:
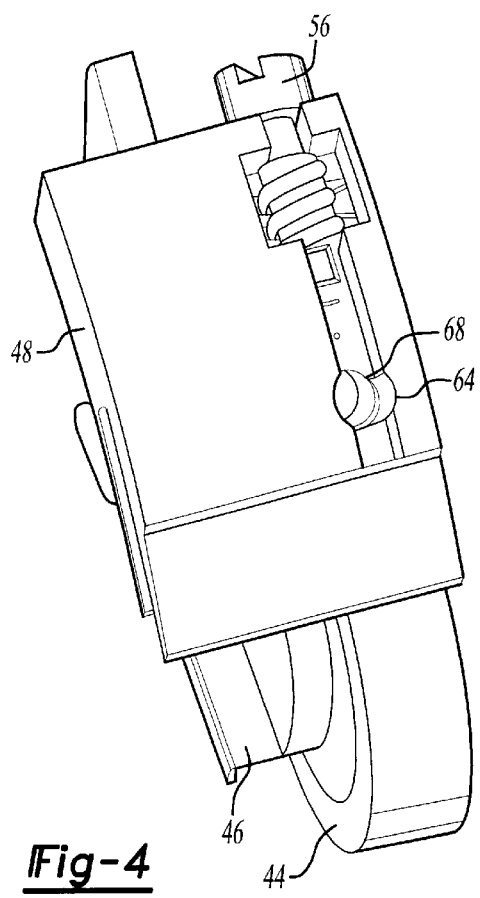
FIG. 4 is a perspective illustration showing selected features of the position controlling device of FIG. 2.

The motor assembly 30 preferably includes a housing portion 40 that houses gears (not illustrated) for transmitting the motive force from the motor portion of the motor assembly to the shaft 28 to locate the blade 26 within the inlet 24. FIGS. 2 and 3 illustrate a portion of the housing 40 with one side removed so that the inventive position controlling device 42 is visible.

The position controlling device 42 includes an arcuate spring 44, a plate portion 46 and a mounting portion 48. The plate portion 46 preferably is fixed to rotate with the shaft 28. The mounting portion 48 preferably is secured to the housing 40. In one example, the mounting portion 48 is molded as a portion of the housing 40.

The mounting portion 48 includes a slot 50 that receives one end 52 of the spring 44. The end 52 of the spring 44 preferably includes a threaded portion 54 that interacts with threads on an adjustment member 56, which is a worm screw in the illustrated example. The adjustment member 56 is received within a portion 58 on the mounting portion 48.

The opposite end 60 of the spring 44 preferably abuttingly engages a stop portion 62 on the plate 46. Adjusting the position of the end 52 of the spring 44 relative to the mounting portion 48, using the adjustment member 56, positions the end 60 and the plate 46 into the desired home position. The spring 44 preferably includes at least one opening 64 that can be aligned with an opening 66 in the housing 40 and an opening 68 in the mounting portion 48. A set screw or other fixing member 70 preferably is inserted through the openings 66, 64 and 68 to maintain the spring end 52 in a fixed position relative to the mounting portion 48.

The position controlling device 42 preferably is set so that the blade portion 26 is in a slightly open position when the spring 44 is at rest. The natural bias of the spring 44 preferably biases the plate portion 46, and therefore the shaft 28 and blade 26, into a position that corresponds to an eight degree opening. The motor assembly 30 preferably is used to move the blade 26 into a fully closed position against the bias of the spring 44. Similarly, the motor assembly 30 preferably is used to move the blade 26 into various open positions as required responsive to the driver's manipulation of the accelerator pedal during vehicle operation. In one example, the motor assembly 30 moves the blade 26 through a rotation of 82 degrees from the home position to a fully wide open position, which corresponds to a 90 degree rotation of the blade 26 from a fully closed position.

The plate portion 46 preferably includes an arcuate cutout 74 with limiting services 76 and 78. Interaction between a post portion 80 on the mounting portion 48 and the limiting surfaces 76 and 78, respectively, limits the amount of movement of the blade portion 26 within the opening 24. In the example where the home position corresponds to an 8° opening, the motor assembly 30 preferably rotates the shaft 28 counter-clockwise (according to the drawings) so that the limiting surface 76 engages the post portion 80 in the fully closed position. Rotation of the shaft 28 and plate portion 46 in a clockwise direction results in opening the inlet to allow a desired air flow. A maximum opening occurs when the limiting surface 78 engages the post portion 80.

Near the home position, the end 60 on the spring 44 engages the stop surface 62 on the plate portion 46 to bias the blade 26 into the home position. As the motor assembly 30 rotates the shaft 28 and plate portion 46 clockwise, an outer arcuate surface 82 engages in inner arcuate surface 84 on the spring 44. This engagement rotates the spring about the shaft axis and effectively winds the spring as the motor assembly 30 moves the blade portion 26.

In the event that the motor assembly 30 fails to operate properly or does not receive appropriate power command signals, for example, the positioning device 42 automatically returns the blade 26 to the home position. In the example where the home position corresponds to a 8° degree opening, some amount of air is allowed into the engine so that the vehicle can be driven to a service location, for example.

The preceding description is exemplary rather than limiting in nature. Variations and modifications may be become apparent to those skilled in the art that do not necessarily depart from the purview and spirit of this invention. The scope of legal protection given to this invention can only be determined by studying the following claims.

We claim:

1. An electronic throttle assembly, comprising:
    a throttle housing having an air inlet opening;
    a blade portion that is supported within the opening;
    an electric motor that selectively moves the blade between a plurality of positions within the opening;
    a position controlling device including a generally arcuate spring that biases the blade portion into a home position; and
    an adjusting member that selectively adjusts a position of the arcuate spring relative to the assembly to control the home position.

2. The assembly of claim 1, wherein the home position includes the blade portion being positioned to permit some air flow into the opening and wherein the motor moves the blade portion against the bias of the spring in a first direction to a closed position where the blade portion closes the opening and the motor moves the blade portion against the bias of the spring in a second direction into a plurality of opened positions.

3. The assembly of claim 1, including a plate portion that engages the spring and moves the spring against the bias of the spring as the motor rotates the blade portion and wherein the plate portion includes limiting surfaces that limit an amount of movement of the blade portion relative to the housing.

4. The assembly of claim 1, including a mounting portion that receives one end of the spring and includes a maintaining member that maintains the end of the spring in a selected position relative to the mounting portion.

5. The assembly of claim 4, wherein the adjusting member selectively adjusts a position of the one end of the spring relative to the mounting portion.

6. The assembly of claim 5, wherein the adjusting member comprises a threaded member and the spring includes a correspondingly threaded surface near the one end that cooperates with the threaded member to adjust the position of the one end of the spring.

7. The assembly of claim 1, wherein the position controlling device includes a stop surface associated with the blade portion for movement with the blade portion and wherein the spring includes a first end that abuts against the stop surface.

8. The assembly of claim 7, wherein the stop surface is supported on a plate that is fixed to rotate with a shaft that supports the blade portion and the plate includes an arcuate outer surface that engages an intermediate portion of the spring so that the spring is wound by rotary movement of the plate in a first direction.

9. The assembly of claim 8, including a mounting portion that receives a second end of the spring and includes a maintaining member that maintains the second end in a selected position relative to the mounting portion.

10. The assembly of claim 9, including a motor assembly housing and wherein the mounting portion is part of the motor assembly housing.

11. A position controlling device for use in an electronic throttle control assembly, comprising:
    a plate portion that is adapted to rotate with a shaft associated with a valve portion of the assembly;
    a generally arcuate spring that biases the plate portion into a home position, the spring having a first end that engages a cooperating surface on the plate portion;
    a mounting portion that supports a second end of the spring and maintains the second end of the spring in a selected position; and
    an adjusting member that selectively adjusts a position of the second end of the spring relative to the mounting portion.

12. The device of claim 11, wherein the plate portion includes an arcuate outer surface that engages an intermediate portion of the spring so that the spring is wound by rotary movement of the plate in a first direction.

13. The device of claim 11, including a maintaining member that maintains the second end in a selected position relative to the mounting portion.

14. The device of claim 11, wherein the adjusting member comprises a threaded member and the spring includes a correspondingly threaded surface near the second end that cooperates with the threaded member to adjust the position of the second end of the spring.

15. The device of claim 11, wherein the plate portion has an arcuate cutout with two limit surfaces at opposite ends of the cutout and the mounting portion includes a stop member that cooperates with the limit surfaces to limit rotary movement of the plate portion.

16. The device of claim 11, including a motor that moves the plate portion relative to the mounting portion against the bias of the spring.

* * * * *